United States Patent
Tokuyama (10) Patent No.: US 7,931,553 B2
(45) Date of Patent: Apr. 26, 2011

(54) BICYCLE SPROCKET APPARATUS WITH A CHAIN SUPPORT STRUCTURE

(75) Inventor: Koji Tokuyama, Sakai (JP)

(73) Assignee: Shimano, Inc., Sakai-ku, Sakai (JP)

( * ) Notice: Subject to any disclaimer, the term of this patent is extended or adjusted under 35 U.S.C. 154(b) by 121 days.

(21) Appl. No.: 11/851,677

(22) Filed: Sep. 7, 2007

(65) Prior Publication Data
US 2008/0188336 A1   Aug. 7, 2008

(30) Foreign Application Priority Data
Feb. 7, 2007 (JP) .................. 2007-028249

(51) Int. Cl.
*F16H 55/30* (2006.01)
(52) U.S. Cl. .............. 474/160; 474/77; 474/78; 474/80; 474/81; 474/144; 474/152; 474/158
(58) Field of Classification Search .................. 474/160, 474/144, 158, 237, 273, 152, 161, 77, 174, 474/78, 148; 192/64, 48.92, 41 R; 280/260, 280/236, 259; D12/123, 124; *B62M 9/10, B62M 1/00, 1/02; F16D 41/30; F16H 9/00, F16H 9/06, 55/12; B60B 27/04*
See application file for complete search history.

(56) References Cited

U.S. PATENT DOCUMENTS

| | | | |
|---|---|---|---|
| 4,198,876 A | 4/1980 | Nagano | |
| 4,296,850 A * | 10/1981 | Isobe | .............................. 192/64 |
| 4,593,799 A | 6/1986 | Ozaki | |
| 4,869,710 A * | 9/1989 | Iwasaki | .......................... 474/160 |
| 5,194,051 A | 3/1993 | Nagano | |
| 5,273,495 A | 12/1993 | Nagano | |
| 5,503,600 A * | 4/1996 | Berecz | .......................... 474/160 |
| 5,954,604 A * | 9/1999 | Nakamura | ..................... 474/160 |
| 6,102,821 A | 8/2000 | Nakamura | |

(Continued)

FOREIGN PATENT DOCUMENTS
DE          2535943 C3     5/1978
(Continued)

OTHER PUBLICATIONS

European search report for EP 08000680.2, the European application that corresponds to this application, dated Jul. 14, 2008.

*Primary Examiner* — Robert A Siconolfi
*Assistant Examiner* — San Aung
(74) *Attorney, Agent, or Firm* — James A. Deland (57) ABSTRACT

A bicycle sprocket apparatus comprises a sprocket mounting member, a first sprocket, and a second sprocket. The sprocket mounting member includes a hub mounting portion and a sprocket mounting portion, wherein the hub mounting portion is structured to be mounted to a rotating hub that rotates around a rotational axis. The sprocket mounting portion includes a first sprocket mounting surface that faces in a first direction and a second sprocket mounting surface that faces in an opposite second direction. The first sprocket is disposed at the first sprocket mounting surface, and the second sprocket is disposed at the second sprocket mounting surface. A fastener fastens the first sprocket to the first sprocket mounting surface, and a chain supporting structure extends from the fastener in the first direction and projects in the first direction away from a side surface of the first sprocket that faces in the first direction.

20 Claims, 13 Drawing Sheets

U.S. PATENT DOCUMENTS

| | | | |
|---|---|---|---|
| 6,382,381 B1 * | 5/2002 | Okajima et al. | 192/64 |
| 7,044,876 B2 | 5/2006 | Kamada et al. | |
| 2004/0070166 A1 * | 4/2004 | Valle | 280/260 |
| 2004/0121867 A1 * | 6/2004 | Reiter | 474/160 |
| 2004/0259675 A1 | 12/2004 | Chattin | |
| 2006/0058140 A1 | 3/2006 | Nakano et al. | |
| 2006/0172840 A1 | 8/2006 | Kamada | |

FOREIGN PATENT DOCUMENTS

| | | |
|---|---|---|
| DE | 3604876 A1 | 8/1986 |
| DE | 10342638 A1 | 4/2005 |
| EP | 0144984 A2 | 12/1984 |
| EP | 0513681 A1 | 11/1992 |
| EP | 0700823 B1 | 5/1999 |
| EP | 1074462 A2 | 8/2000 |
| EP | 1186446 A2 | 3/2002 |
| EP | 1604894 A2 | 12/2005 |
| EP | 1431172 B1 | 6/2006 |
| FR | 1519785 A | 4/1968 |
| FR | 2219709 A5 | 9/1974 |

* cited by examiner

BICYCLE SPROCKET APPARATUS WITH A CHAIN SUPPORT STRUCTURE

BACKGROUND OF THE INVENTION

The present invention is directed to bicycle sprocket assemblies and, more particularly, to a bicycle sprocket assembly that has a chain support structure.

A bicycle sprocket assembly may comprise, for example, a plurality of chain-engaging sprockets attached to a freewheel assembly mounted together with a rear wheel hub. The smallest-diameter sprocket having the least number of teeth usually is positioned on the axially outermost side, and the largest-diameter sprocket having the greatest number of teeth is positioned on the axially innermost side. A rear derailleur typically is mounted in close proximity to the sprocket assembly for switching a bicycle chain among the plurality of sprockets.

In such a sprocket assembly, the largest-diameter sprocket is mounted close to the spokes of the rear wheel. If the chain accidentally derails axially inwardly from the largest-diameter sprocket and drops toward the rear wheel hub, a nearby spoke may be damaged. Conventional approaches to solve this problem include mounting a disc-shaped spoke protector between the largest-diameter sprocket and the spokes to reduce the risk of the chain derailing from the sprocket and to reduce the risk of damage to the spokes if the chain does derail from the sprocket. The spoke protector usually is made of a transparent resin, and the spoke protector is formed with a diameter far greater than the diameter of the largest-diameter sprocket. See, for example, spoke protector model number CS-LG50 shown at pages 48-49 of the 2006 Bicycle Components Trade Sales & Support Manual, August 2005, published by Shimano Inc. Unfortunately, the spoke protector increases the number of parts that must be assembled to form the wheel assembly. The spoke protector also increases the cost of the wheel assembly.

SUMMARY OF THE INVENTION

The present invention is directed to various features of a bicycle sprocket assembly. In one embodiment, a bicycle sprocket apparatus comprises a sprocket mounting member, a first sprocket, and a second sprocket. The sprocket mounting member includes a hub mounting portion and a sprocket mounting portion, wherein the hub mounting portion is structured to be mounted to a rotating hub that rotates around a rotational axis. The sprocket mounting portion includes a first sprocket mounting surface that faces in a first direction and a second sprocket mounting surface that faces in an opposite second direction. The first sprocket is disposed at the first sprocket mounting surface, and the second sprocket is disposed at the second sprocket mounting surface. A fastener fastens the first sprocket to the first sprocket mounting surface, and a chain supporting structure extends from the fastener in the first direction and projects in the first direction away from a side surface of the first sprocket that faces in the first direction.

In another embodiment, a bicycle sprocket apparatus comprises a sprocket mounting member, a first sprocket, and a second sprocket. The sprocket mounting member includes a hub mounting portion and a sprocket mounting portion, wherein the hub mounting portion is structured to be mounted to a rotating hub that rotates around a rotational axis. The sprocket mounting portion includes a first sprocket mounting surface that faces in a first direction and a second sprocket mounting surface that faces in an opposite second direction. The first sprocket is mounted to the first sprocket mounting surface, and the second sprocket is mounted to the second sprocket mounting surface. The sprocket mounting member forms a chain support member that projects in the first direction away from a side surface of the first sprocket that faces in the first direction.

In another embodiment, a bicycle sprocket apparatus comprises a sprocket mounting member, a first sprocket, and a second sprocket. The sprocket mounting member includes a hub mounting portion and a sprocket mounting portion, wherein the hub mounting portion has an inner peripheral surface structured to be mounted to a rotating hub that rotates around a rotational axis. The sprocket mounting portion includes a first sprocket mounting surface that faces in a first direction and a second sprocket mounting surface that faces in an opposite second direction. The first sprocket is mounted to the first sprocket mounting surface, and the second sprocket is mounted to the second sprocket mounting surface. The first sprocket forms a chain support member that projects in the first direction away from a side surface of the first sprocket that faces in the first direction, and an innermost peripheral surface of the first sprocket is disposed radially outwardly from the inner peripheral surface of the hub mounting portion.

In another embodiment, a bicycle sprocket apparatus comprises a sprocket mounting member, a first sprocket, and a second sprocket. The sprocket mounting member includes a hub mounting portion and a sprocket mounting portion, wherein the hub mounting portion is structured to be mounted to a rotating hub that rotates around a rotational axis. The sprocket mounting portion includes a first sprocket mounting surface that faces in a first direction and a second sprocket mounting surface that faces in an opposite second direction. The first sprocket is mounted to the first sprocket mounting surface, and the second sprocket is mounted to the second sprocket mounting surface. A chain supporting structure extends from the second sprocket in the first direction and projects in the first direction away from a side surface of the first sprocket that faces in the first direction.

Additional inventive features will become apparent from the description below, and such features alone or in combination with the above features and their equivalents may form the basis of further inventions as recited in the claims.

DETAILED DESCRIPTION OF THE EMBODIMENTS

Figure 1:
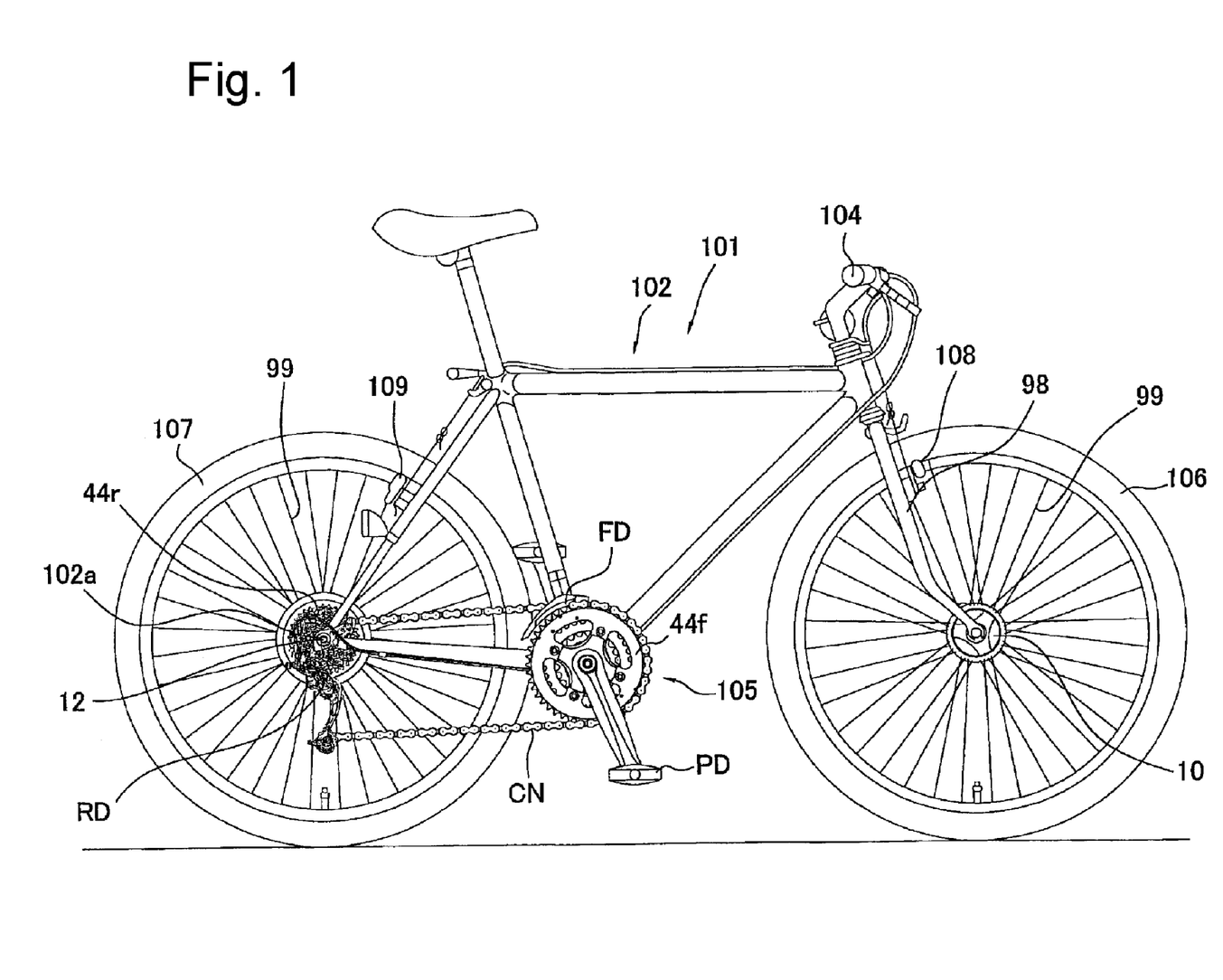
FIG. 1 is a side view of a bicycle that employs an embodiment of a sprocket assembly.

FIG. 1 is a side view of a particular embodiment of a bicycle 101. Bicycle 101 is a mountain bicycle comprising a diamond-shaped frame 102, a front fork 98 rotatably mounted to frame 102, a handlebar assembly 104 mounted to the upper part of fork 98, a front wheel 106 including spokes 99 and a front hub 10 rotatably attached to the lower part of fork 98, a rear wheel 107 including spokes 99 and a rear hub 12 rotatably attached to a pair of rear dropouts 102a of frame 102, and a drive unit 105. A front wheel brake 108 is provided for braking front wheel 106, and a rear wheel brake 109 is provided for braking rear wheel 107. Drive unit 105 comprises a chain CN, a front sprocket assembly 44f coaxially mounted with a crank having pedals PD, a front derailleur FD attached to a seat tube of frame 102, a rear sprocket assembly 44r coaxially mounted with rear wheel 107, and a rear derailleur RD.

Figure 2:
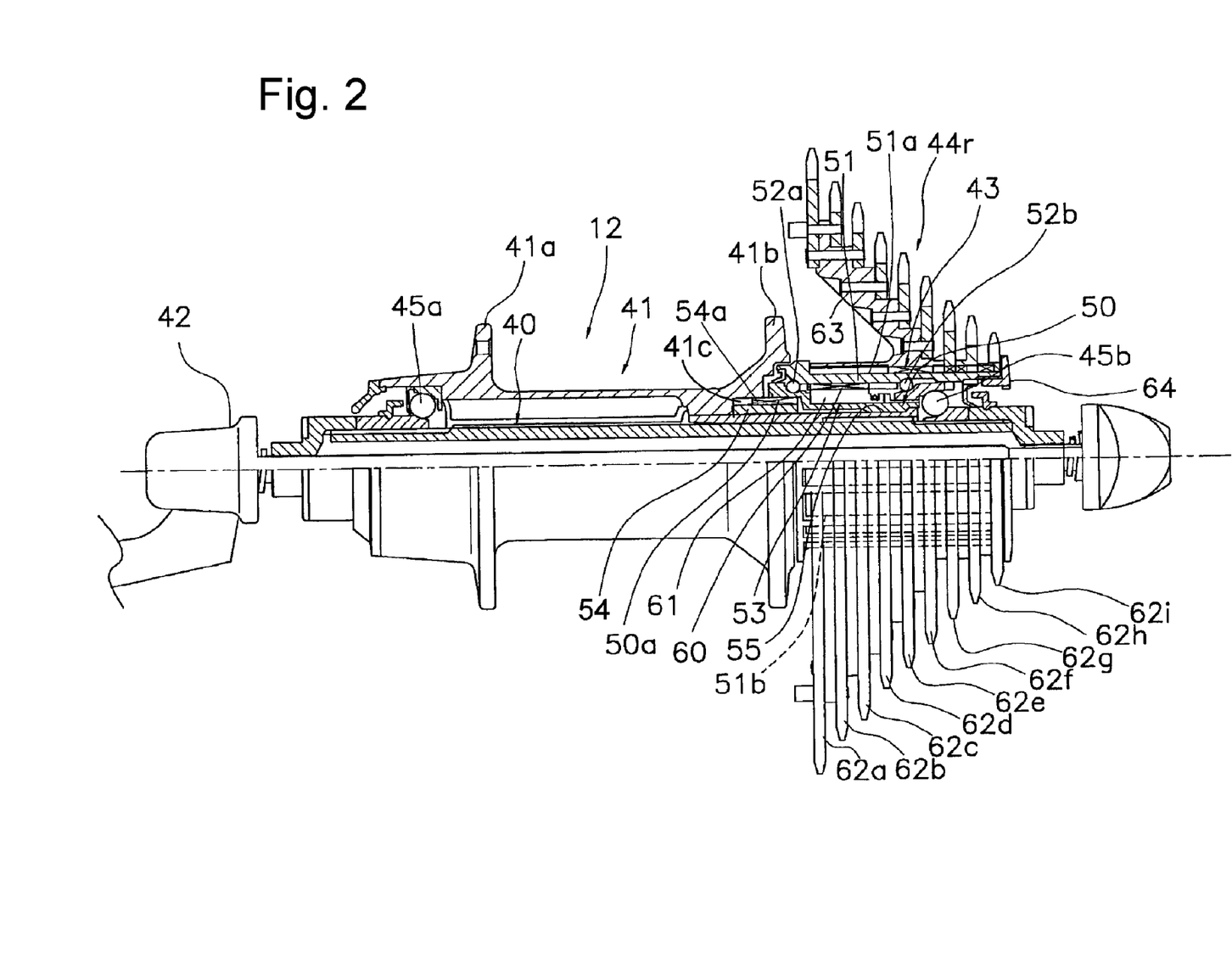
FIG. 2 is a partial cross-sectional view of a particular embodiment of a sprocket assembly attached to a rear wheel hub.

As shown in FIG. 2, rear hub 12 includes a hub shaft 40 that detachably mounts to rear dropouts 102a, a hub body 41 disposed around hub shaft 40, a freewheel assembly 43 disposed at the right side of hub body 41, and first and second bearings 45a and 45b respectively arranged between hub shaft 40 and hub body 41 and between the hub shaft 40 and freewheel assembly 43 so that hub body 41 and freewheel assembly 43 are rotatably supported on hub shaft 40. A rear sprocket assembly 44r having a plurality of (e.g., nine) coaxially mounted sprockets 62a-62i is nonrotatably fixed relative to a sprocket mounting surface 51a of an outside member 51 of freewheel assembly 43 so that sprockets 62a-62i rotate integrally with outside member 51. The number of teeth on and the diameter of each sprocket 62a-62i respectively decrease so that the largest-diameter sprocket 62a is located at the axially innermost position, and the smallest-diameter sprocket 62i is located at the axially outermost position. In this embodiment, the numbers of teeth on sprockets 62a-62i are 34, 30, 26, 23, 20, 17, 15, 13, and 11, respectively.

Hub shaft 40 includes a typical quick-release mechanism 42 so that hub shaft 40 can be attached to and detached from rear dropouts 102a easily without requiring the use of a tool. Hub body 41 is a substantially cylindrical member formed with hub flanges 41a and 41b. Hub body 41 may comprise an aluminum alloy, for example, and spokes 99 are attached at various locations along the outer peripheral surfaces of hub flanges 41a and 41b.

Freewheel assembly 43 comprises an inside member 50, outside member 51 disposed around inside member 50, third and fourth bearings 52a and 52b disposed between inside member 50 and outside member 51 so that outside member 51 is rotatably supported around inside member 50, and a pawl-type one-way clutch 53 disposed between inside member 50 and outside member 51 for transmitting rotation of inside member 50 to outside member 51 in only one direction to propel the bicycle forwardly.

Inside member 50 comprises a stepped cylindrical member made of a high strength steel (e.g., chromium-molybdenum steel). Inside member 50 is connected to hub body 41 by a cylindrical connecting member 54 so that inside member 50 rotates integrally with hub body 41. More specifically, connecting member 54 includes splines 54a formed on the outer peripheral surface thereof for engaging splines 50a formed on the inner peripheral surface of inside member 50 and for engaging splines 41c formed on the inner peripheral surface of hub body 41. Inside member 50 is axially fixed to hub body 41 by a cylindrical bolt 55 that extends through the inner peripheral surface of inside member 50, extends through the inner peripheral surface of connecting member 54, and screws into a threaded inner peripheral surface of hub body 41.

Outside member 51 is rotatably supported on the outer peripheral surface of inside member 50 by third and fourth bearings 52a and 52b. Outside member 51 has a mounting surface 51a that forms a plurality of (e.g., six) splines 51b with different circumferential widths for mounting rear sprocket assembly 44r.

One-way clutch 53 comprises a plurality of ratchet teeth 60 formed on the inner peripheral surface of outside member 51, three clutch pawls 61 circumferentially disposed around the outer peripheral surface of inside member 50, and a biasing member (not shown) for biasing clutch pawls 61 toward ratchet teeth 60 in a known manner.

Figure 3:
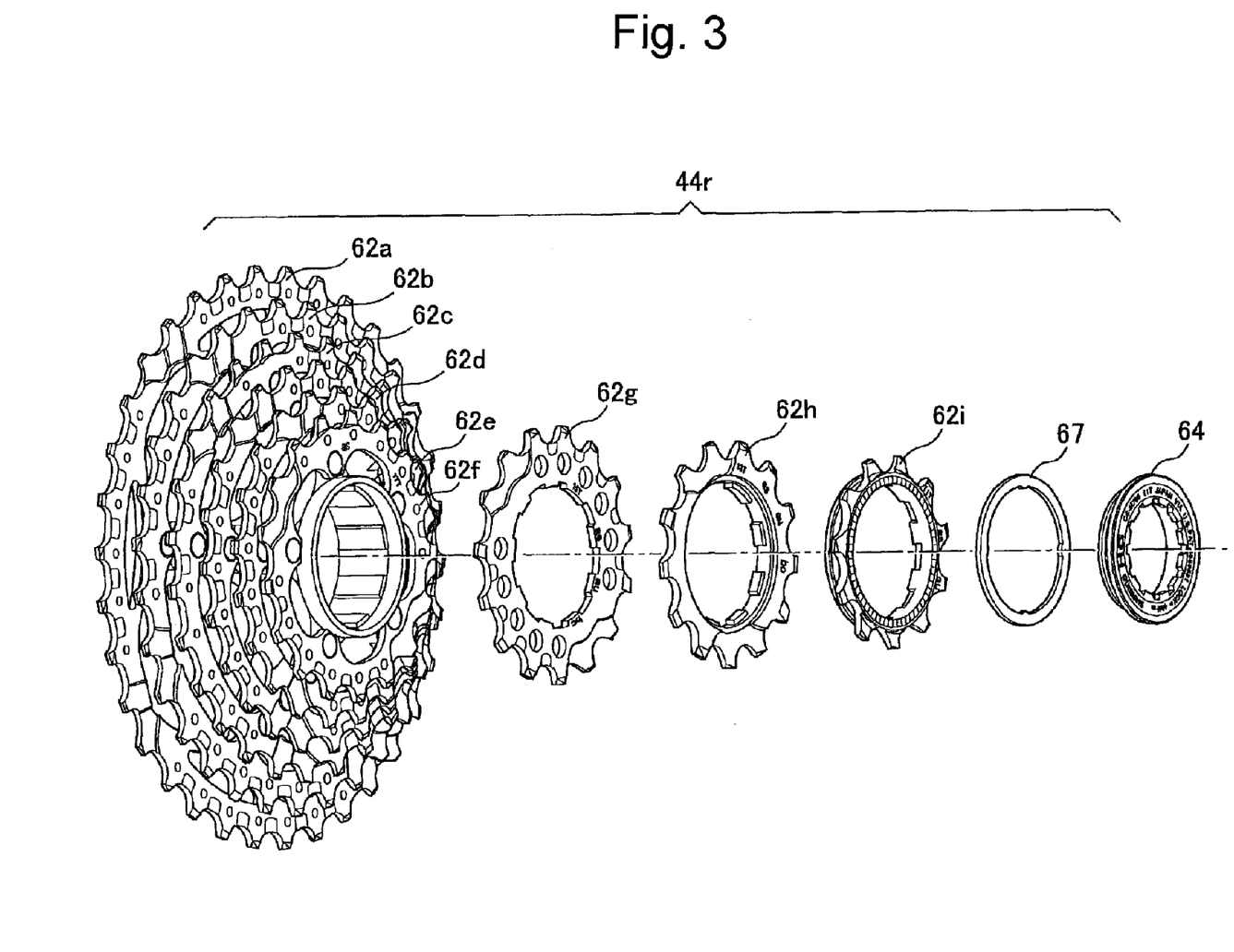
FIG. 3 is an exploded perspective view of the sprocket assembly shown in FIG. 2.
Figure 4:
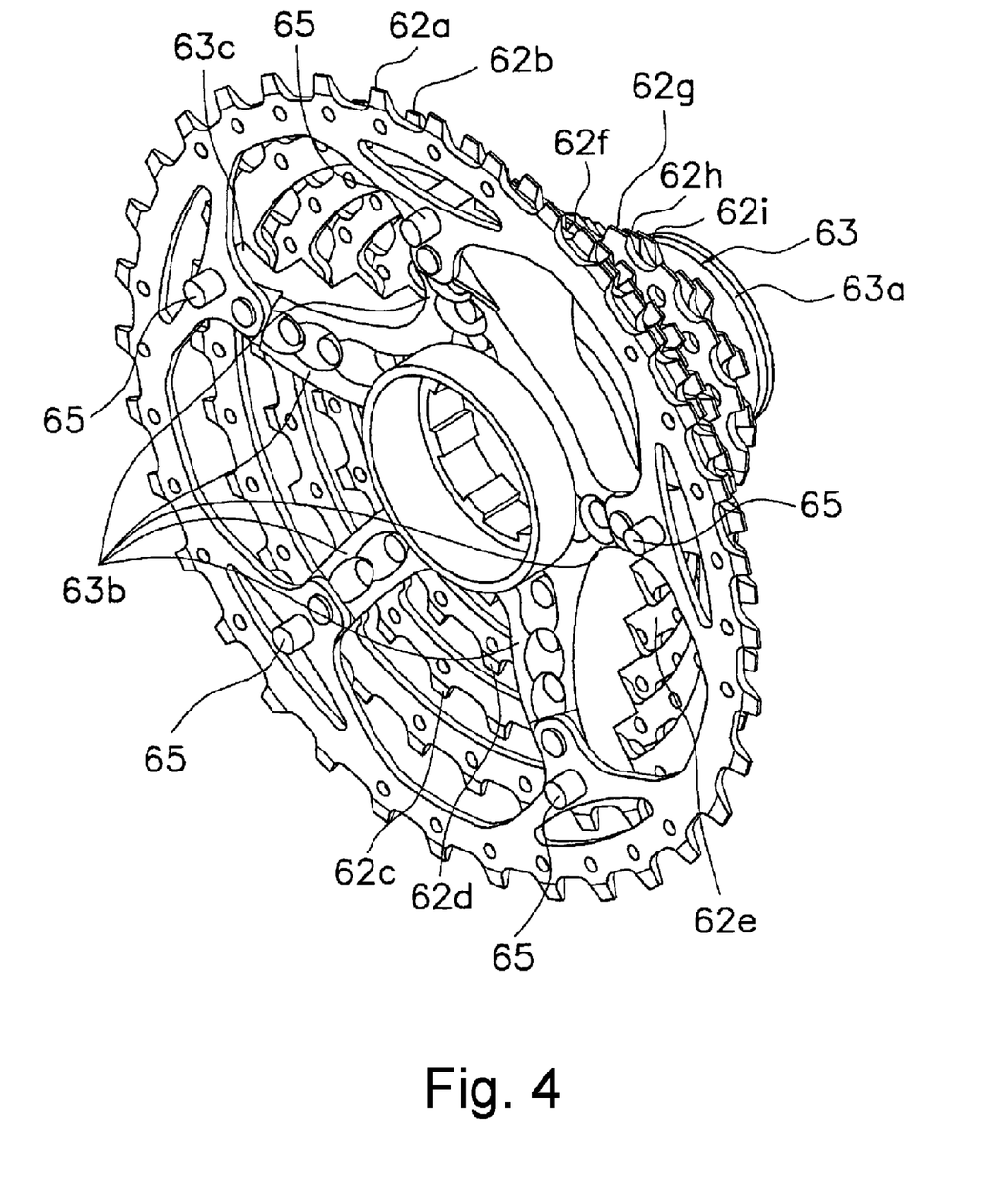
FIG. 4 is a rear perspective view of the sprocket assembly.
Figure 5:
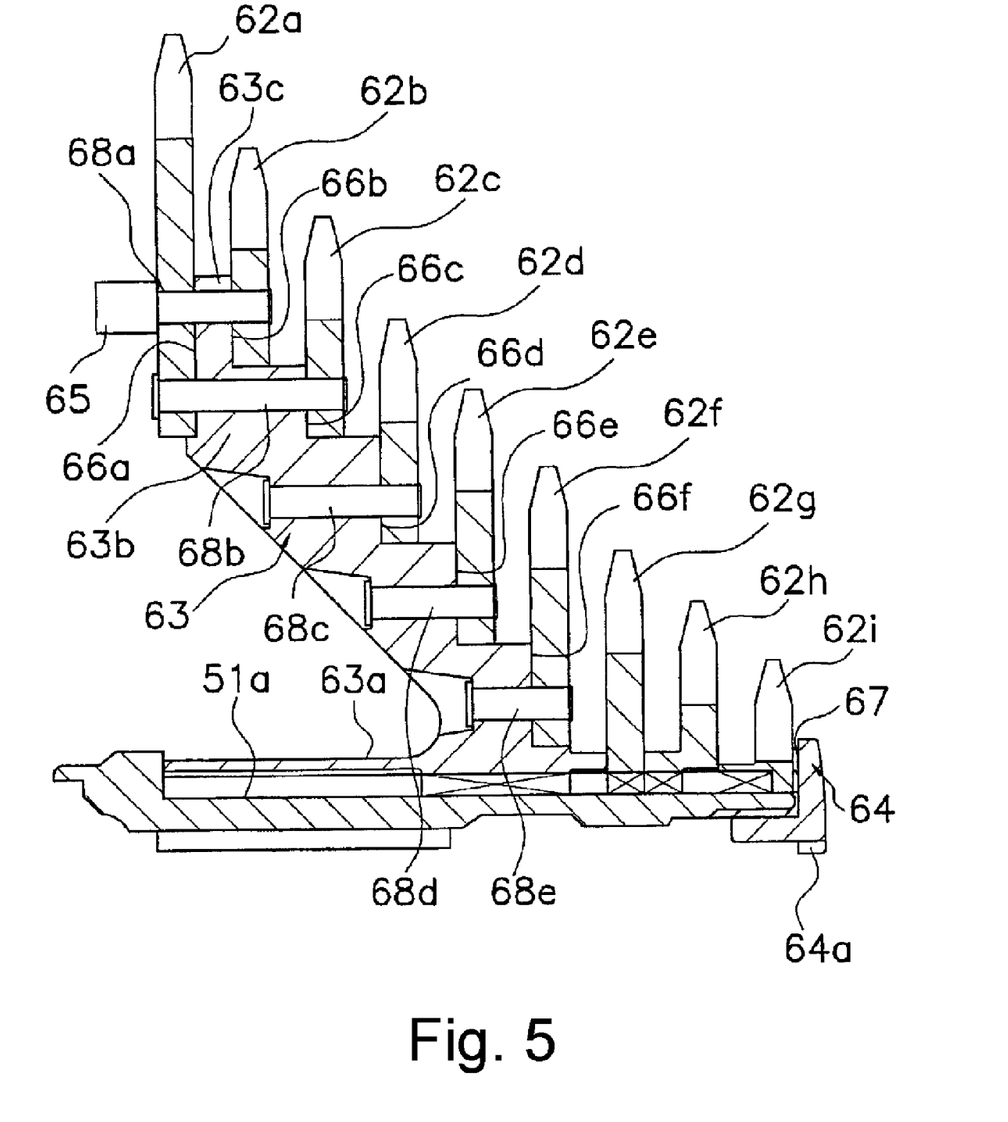
FIG. 5 is an enlarged half sectional view of the sprocket assembly.

As shown in FIGS. 3-5, rear sprocket assembly 44r comprises the plurality of sprockets 62a-62i, a sprocket mounting member 63 structured of mount selected ones of the plurality of sprockets 62a-62i (e.g., sprockets 62a-62f), a lock nut 64 for fixing rear sprocket assembly 44r to outside member 51 of freewheel assembly 43, and a lock washer 67 disposed between lock nut 64 and sprocket 62i. Rear sprocket assembly 44r also has at least one (e.g., three) chain supporting structures 65 to reduce the risk of chain CN derailing from sprocket 62a and to reduce the risk of damage to spokes 99 if chain CN does derail from sprocket 62a.

Sprocket mounting member 63 mounts sprockets 62a-62f in a stepped configuration. In this embodiment, sprocket mounting member 63 comprises a cylindrical hub mounting portion 63a and a sprocket mounting portion in the form of five sprocket mounting arms 63b extending radially from hub mounting portion 63a. Hub mounting portion 63a is structured to be nonrotatably mounted to splines 51b on outside member 51 so that hub mounting portion 63a rotates together with outside member 51. Each sprocket mounting portion 63b comprises, for example, an axially inwardly facing sprocket mounting surface 66a and five axially outwardly facing sprocket mounting surfaces 66b-66f, wherein sprocket mounting surface 66a is directly opposite sprocket mounting surface 66b, and the radial distances of mounting surfaces 66b-66f from the rotational axis decrease in a stepwise manner. Sprockets 62a-62f are mounted to sprocket mounting surfaces 66a-66f, respectively.

In this embodiment, sprockets 62g-62i are disposed individually on mounting surface 51a of outside member 51. Sprockets 62g-62i and mounting member 63 are fixed together by lock nut 64 which screws into a threaded inner peripheral end surface of outside member 51. Lock nut 64 has a tool engaging surface 64a for engaging an installation and removal tool.

Sprockets 62a-62f are fixed to mounting surfaces 66a-66f by five each of staking pins 68a-68e. Each staking pin 68a-68e has a large-diameter head part, and each staking pin is inserted from the axially inner side of sprocket mounting portion 66 so that the head part is disposed on the axially inner side of sprocket mounting portion 66. Staking pins 68a fasten sprockets 62a and 62b to a radially outermost portion 63c of each sprocket mounting arm 63b, and staking pins 63b mount sprockets 62a and 62c to sprocket mounting arms 63b. Staking pins 68c-68e attach sprockets 62d-62f to mounting surfaces 66d-66f individually.

The head part of each staking pin 68a is longer than the head parts of the other staking pins 68b-68e and projects axially inwardly (in a first direction) away from the side surface of sprocket 62a that faces axially inwardly. This projection forms a chain supporting structure 65. Thus, in this embodiment there are five chain supporting structures 65. Each chain supporting structure 65 may project from approximately 2 millimeters to approximately 10 millimeters, preferably from approximately 3 millimeters to approximately 10 millimeters, so that chain CN is sufficiently supported in the event of derailment and preventing interference between chain CN and spokes 99. The axial length of chain supporting structures 65 may vary as wheel technology varies.

To assemble rear sprocket assembly 44r, sprockets 62a-62f are attached to sprocket mounting member 63 using staking pins 68a-68e. Then, sprocket mounting member 63 with the attached sprockets 62a-62f is placed over sprocket mounting surface 51a, and sprockets 62g-62i are placed over sprocket mounting surface 51a in the order indicated. Finally, washer 67 is mounted, and lock nut 64 is screwed into the threaded inner peripheral surface of outside member 51 and tightened with a predetermined torque using the appropriate tool.

Figure 6:
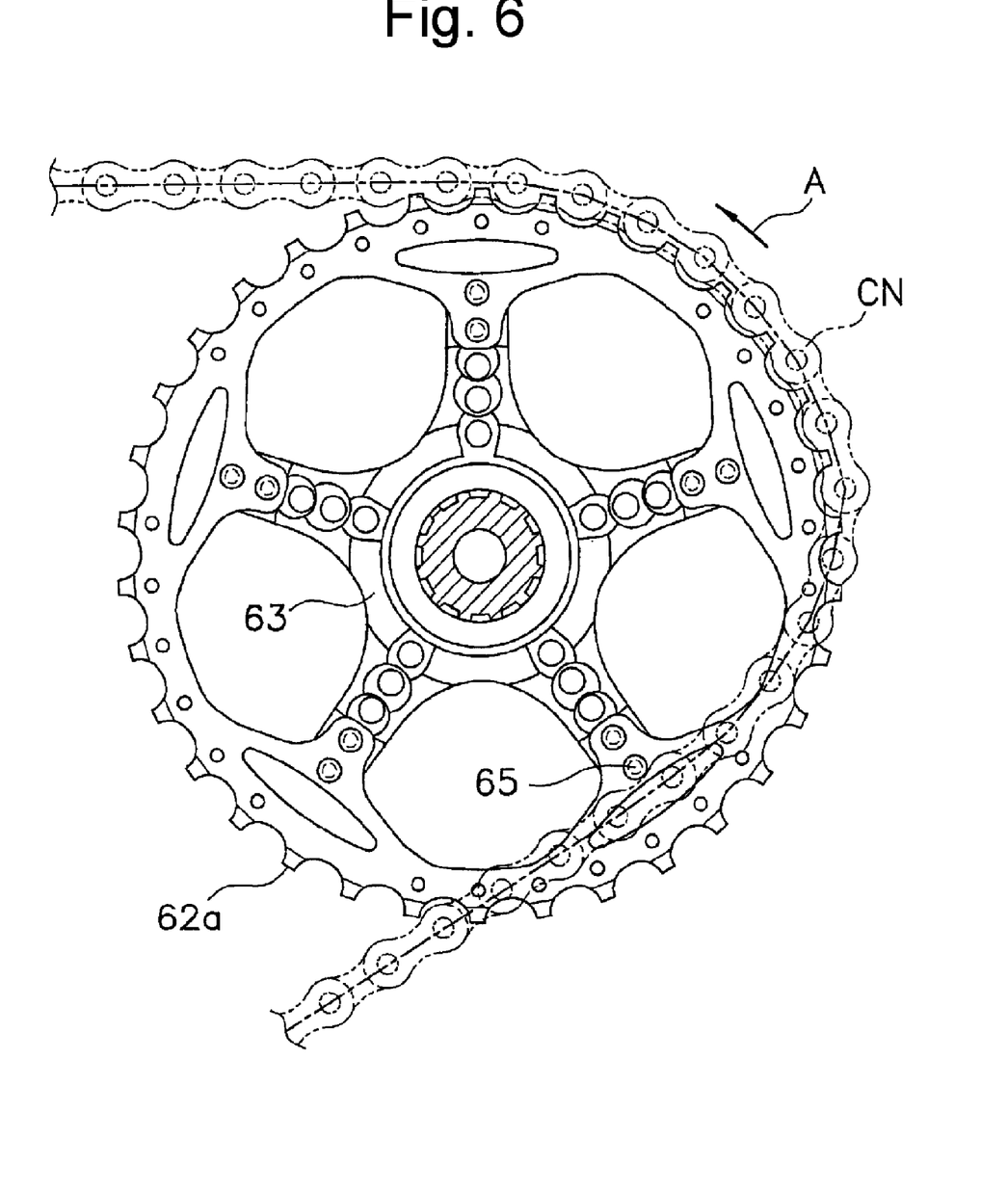
FIG. 6 is a rear view of the sprocket assembly showing a chain derailing from the largest-diameter sprocket.

When bicycle 101 having the above-described rear sprocket assembly 44r is ridden, chain CN may accidentally derail axially inwardly from sprocket 62a as shown in FIG. 6. (In FIG. 6, sprockets 62b-62i are omitted for clarity.) This may occur, for example, when bicycle 101 is ridden at low speed over irregular ground, when the rider performs a downshift operation to sprocket 62a, when chain CN insufficiently engages sprocket 62a, when the tension of chain CN decreases as a result of pivoting of the chain guide of rear derailleur RD, or for some other reason. The portion of chain CN that comes off of sprocket 62a is caught by chain supporting structure 65 and is prevented from falling further radially inwardly. All of this occurs without increasing the complexity and cost of assembling the rear hub 12. Furthermore, if rear sprocket assembly 44r is rotated in reverse, or if rear derailleur RD is moved axially outwardly and rear sprocket assembly 44r is rotated in the forward direction, then chain CN may return to its proper position on sprocket 62a.

Figure 7:
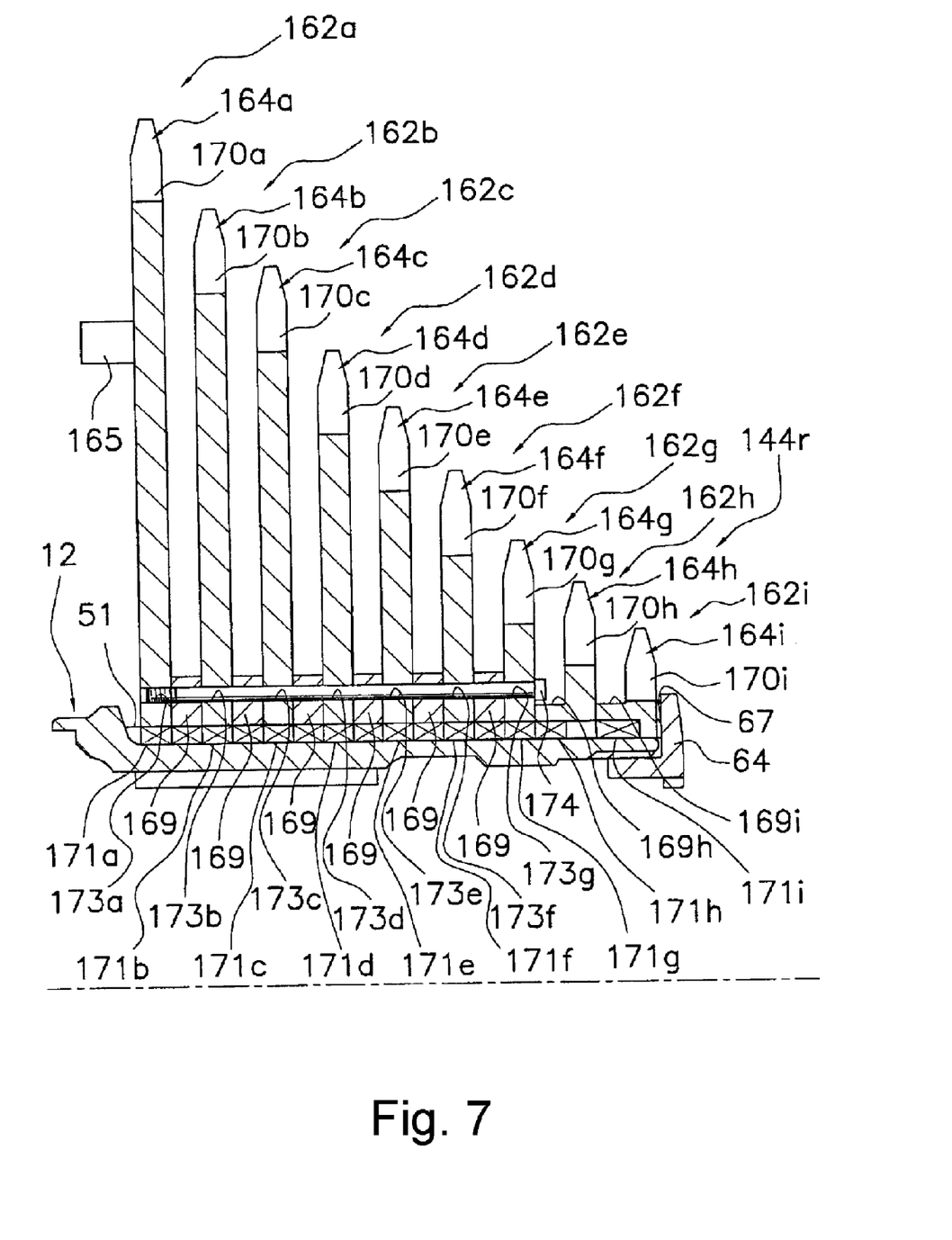
FIG. 7 is an enlarged half sectional view of another embodiment of a sprocket assembly.

In the first embodiment described above, at least some of the sprockets were mounted indirectly to outside member 51 of freewheel assembly 43 through sprocket mounting member 63. However, as shown in FIG. 7, the teachings herein also may be applied to a rear sprocket assembly 144r in which all of the sprockets are nonrotatably mounted directly to outside member 51. More specifically, in this embodiment rear sprocket assembly 144r comprises sprockets 162a-162i, six spacer rings 169 arranged between sprockets 162a-162g, and three connecting bolts 174 that extend through openings in spacers 169 and through openings 173b-173g in sprockets 162b-162g. Connecting bolts 174 screw into threaded openings 173a in sprocket 162a. Sprockets 162a-162i have respective sprocket bodies 164a-164i, respective pluralities of sprocket teeth 170a-170i formed on the outer peripheries of sprocket bodies 164a-164i, and connecting members 171a-171i formed on the inner peripheral surfaces of sprocket bodies 164a-164i for mounting sprockets 162a-162i directly to outside member 51. Sprockets 162h and 162i are nonrotatably mounted directly and individually to outside member 51. Sprockets 162h and 162i each have integrally formed cylindrical spacer parts 169h and 169i so that separate spacer rings 169 are not required for those sprockets. Sprockets 162a-162i are fixed to outside member 51 through a lock nut 64 and a washer 67 in a manner similar to the first embodiment. As a result, sprockets 162a-162i rotate together as a unit with outside member 51. The numbers of teeth on sprockets 162a-162i may be 32, 28, 24, 21, 18, 16, 14, 12, and 11, respectively.

In this embodiment, six rod-shaped chain supporting structures 165 are circumferentially attached along the axially inner surface of sprocket 162a. Chain supporting structures 165 may be attached to sprocket 162a by any appropriate method such as by staking, by bonding, or by screwing. As in the above embodiment, each chain supporting structure 165 may project from approximately 2 millimeters to approximately 10 millimeters, preferably from approximately 3 millimeters to approximately 10 millimeters, from the axially inner surface of sprocket 162a.

To assemble rear sprocket assembly 144r, sprockets 162a-162f and spacer rings 169 are attached together using connecting bolts 174, sprockets 162a-162f and spacer rings 169 are mounted as a unit to outside member 51, and then sprockets 162h and 162i are mounted to outside member 51. Finally, washer 67 is mounted, and lock nut 64 is screwed into the threaded inner peripheral surface of outside member 51 and tightened with a predetermined torque using the appropriate tool.

Figure 8:
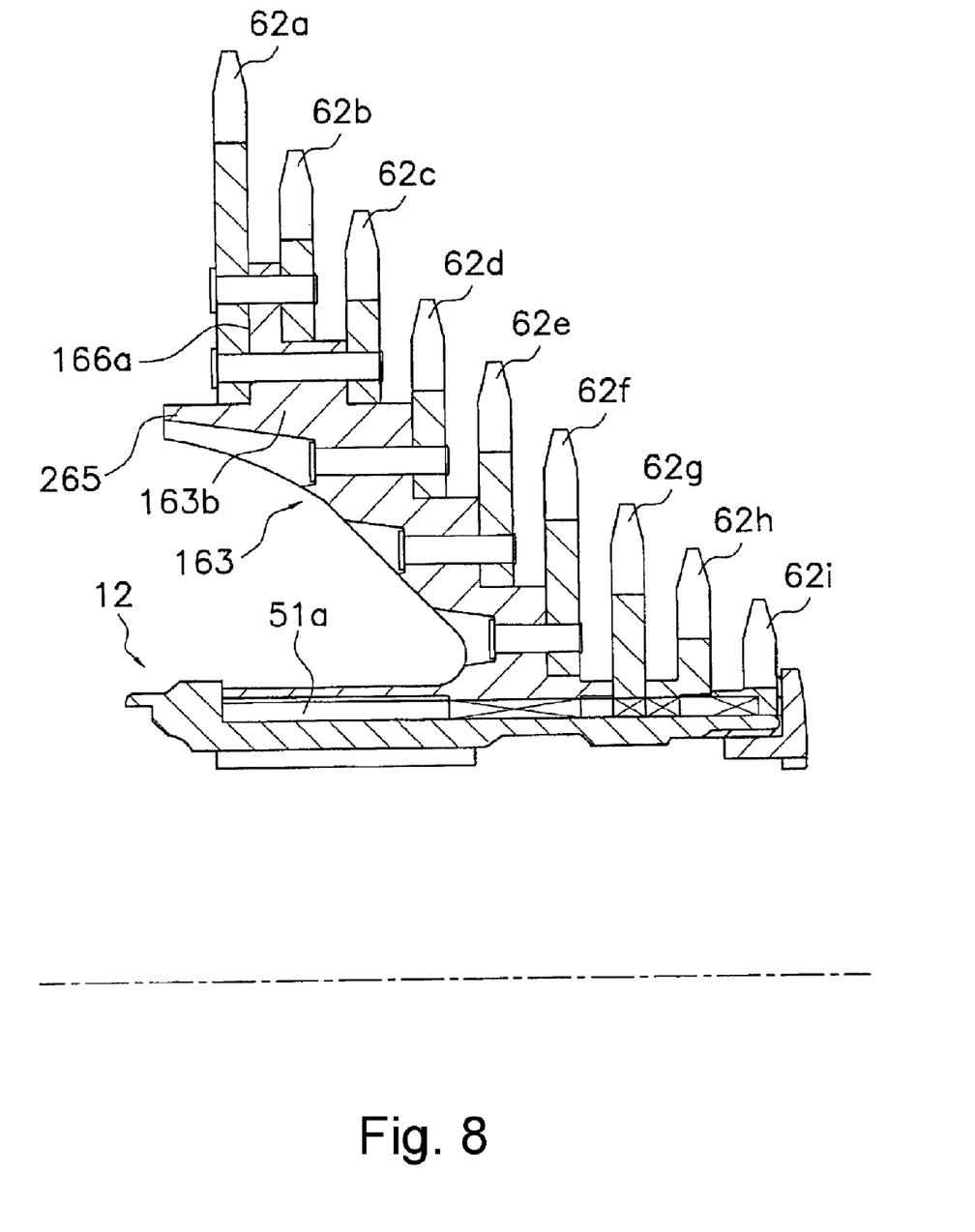
FIG. 8 is an enlarged half sectional view of another embodiment of a sprocket assembly.
Figure 9:
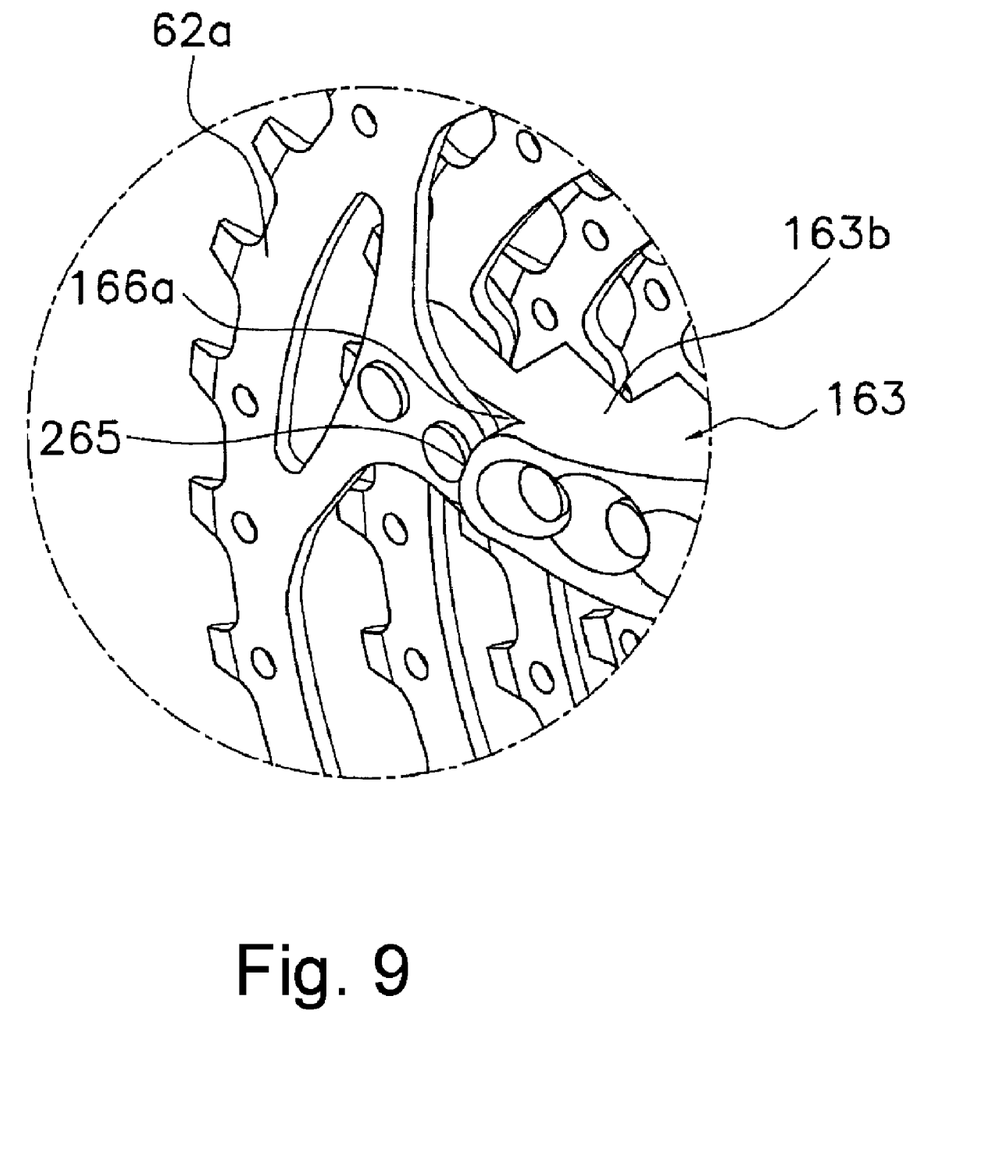
FIG. 9 is a rear perspective view of a portion of another embodiment of a sprocket assembly.

In the first and second embodiments described above, chain supporting structures 65 and 165 were mounted to sprockets 62a and 162a, respectively. However, as shown in FIGS. 8 and 9, chain supporting structures 265 may be provided integrally as one piece with a sprocket mounting member 163. In this embodiment, chain supporting structures 265 project axially inwardly from mounting surfaces 166a of five arm portions 163b of sprocket mounting member 163. If desired, chain supporting structures 265 may comprise separate members attached by an appropriate method to sprocket mounting member 163. Other details of this embodiment may be the same as in the first embodiment.

Figure 10:
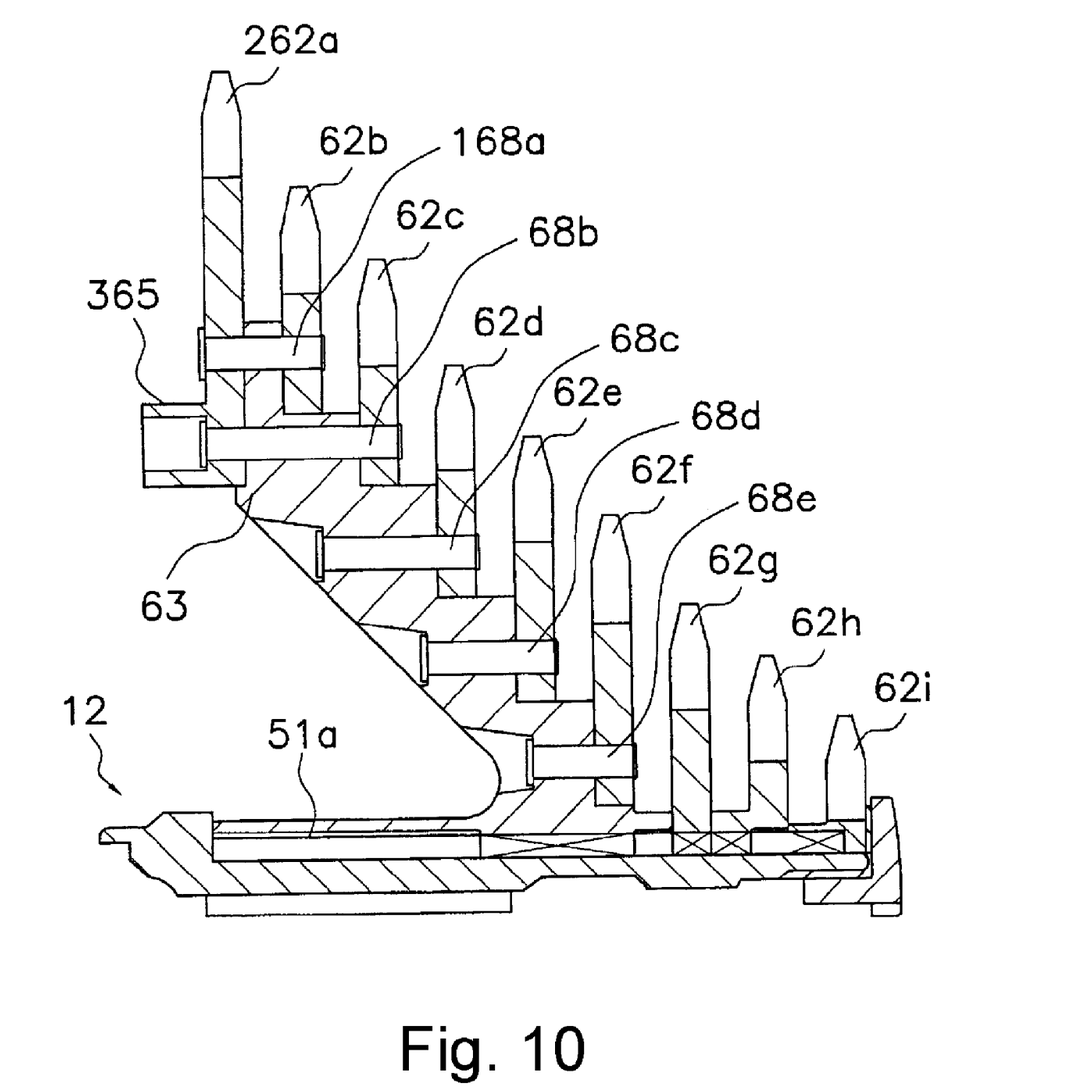
FIG. 10 is an enlarged half sectional view of another embodiment of a sprocket assembly.
Figure 11:
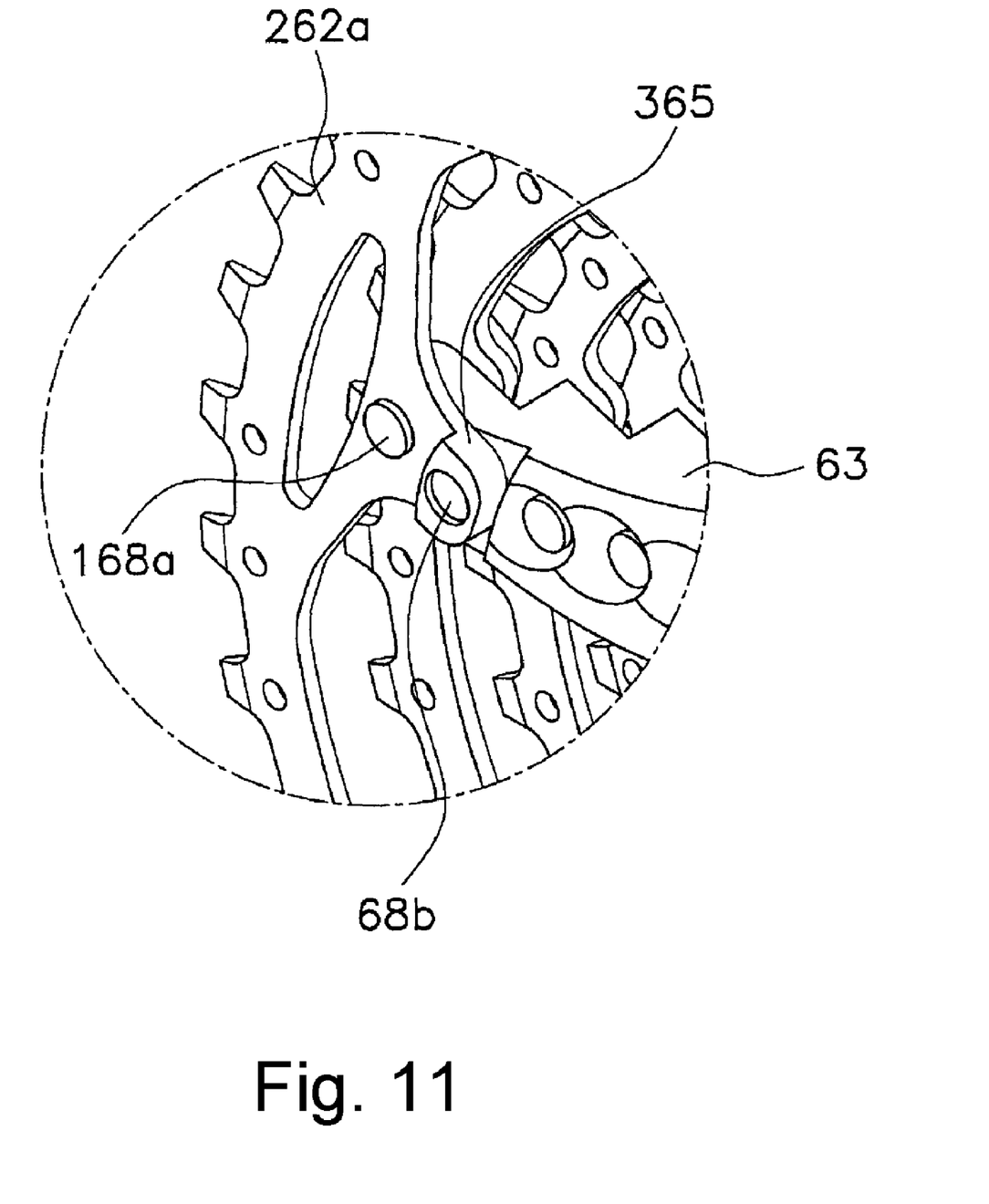
FIG. 11 is a rear perspective view of a portion of another embodiment of a sprocket assembly.

In the first and second embodiments described above, chain supporting structures 65 and 165 were provided separately from sprockets 62a and 162a, respectively. However, as shown in FIGS. 10 and 11, chain supporting structures 365 may be provided integrally as one piece with a sprocket 262a. In this embodiment, chain supporting structures 365 project axially inwardly from the axially inner surface of sprocket 262a at the location of staking pin 68b, and staking pin 68b is located within chain supporting structure 365. In this embodiment, a regular staking pin 168a is used in place of staking pin 68a shown in FIG. 5. If desired, chain supporting structures 365 and staking pins 68b may be placed in different axial and/or radial locations relative to each other. Other details of this embodiment may be the same as in the first embodiment.

Figure 12:
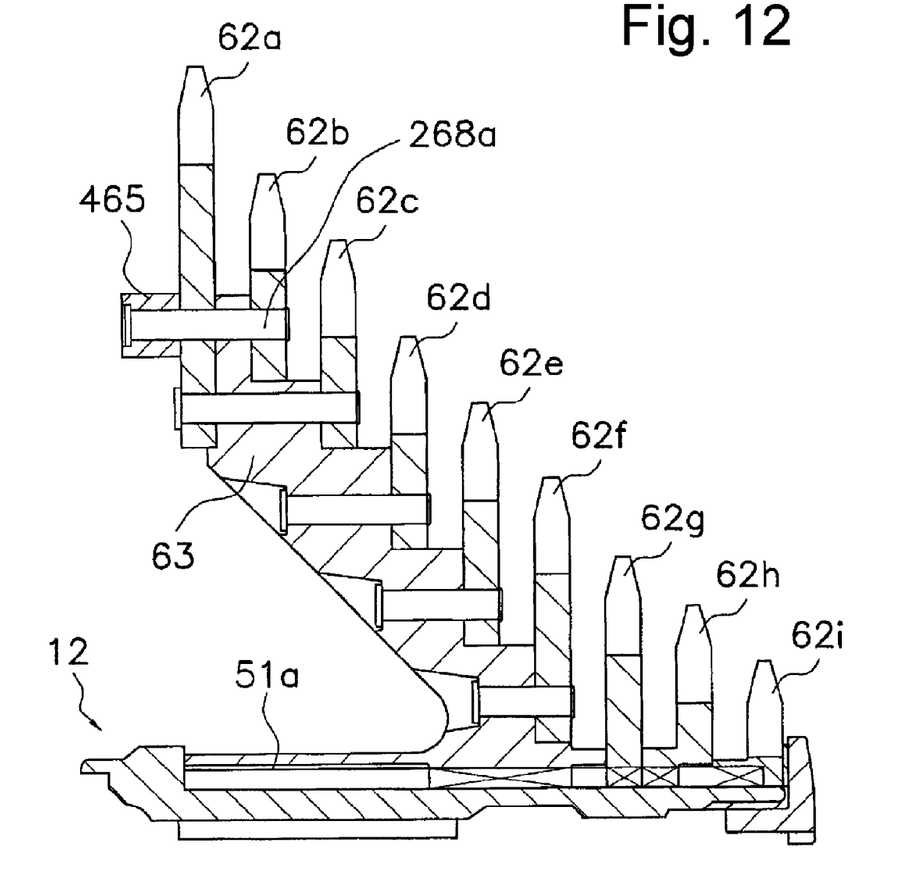
FIG. 12 is an enlarged half sectional view of another embodiment of a sprocket assembly.
Figure 13:
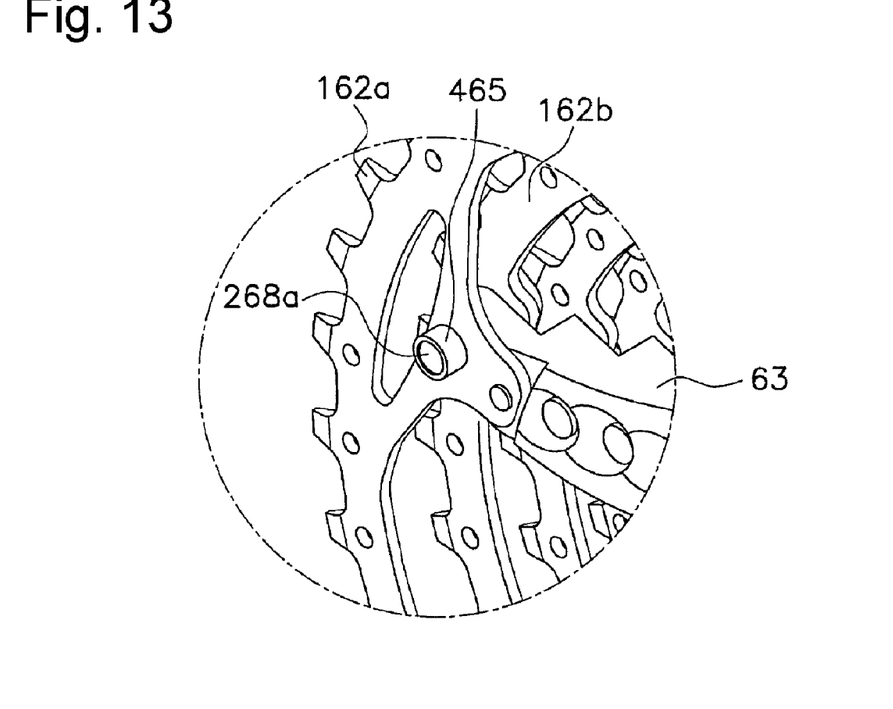
FIG. 13 is a rear perspective view of a portion of another embodiment of a sprocket assembly.

In the first embodiment, chain supporting structures 65 were formed solely by the head part 68f of staking pin 68a. However, as shown in FIGS. 12 and 13, a cap member 465 in the form of a tubular cylindrical member may be placed over a projecting portion of a staking pin 268a to form an overall chain supporting structure. In this embodiment, the length of the shank part of staking pin 268a is longer than the length of the shank part of staking pin 68a in the first embodiment. Other details of this embodiment may be the same as in the first embodiment.

Figure 14:
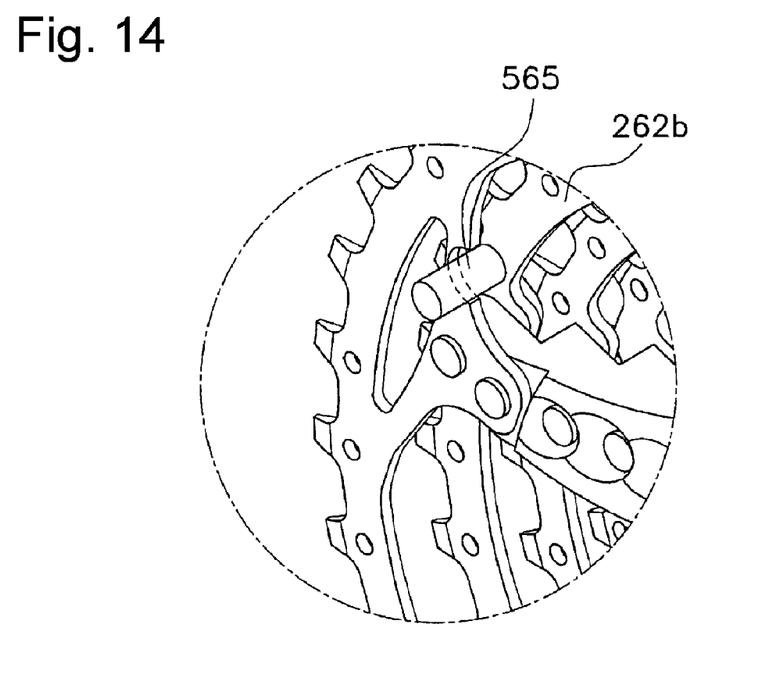
FIG. 14 is a rear perspective view of a portion of another embodiment of a sprocket assembly.

In the first, second, fourth, and fifth embodiments described above, chain supporting structures 65, 165, 365, and 465 were mounted directly to the largest-diameter sprockets 62a, 162a and 262a. However, as shown in FIG. 14, a chain supporting structure 565 may be associated with a sprocket 262b mounted axially inwardly of (e.g., adjacent to) the largest diameter sprocket. For example, chain supporting structure 565 may comprise a rod-shaped member erected on sprocket 262b by a method as described above for the first embodiment.

While the above is a description of various embodiments of inventive features, even further modifications may be employed without departing from the spirit and scope of the present invention. For example, in the first embodiment the chain supporting structure 65 is formed by increasing the length of the head part of staking pin 68a. However, a chain supporting structure may be formed by increasing the length of the head part of staking pin 68b. While a plurality of discrete chain supporting structures were disclosed in the above embodiments, a chain supporting structure may be formed, for example, by one annular protrusion projecting axially inwardly from the sprocket or sprocket mounting member.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. For example, such terms may include a deviation of at least ±5% of the modified term as long as such a deviation would not negate the meaning of the word it modifies. Thus, the scope of the invention should not be limited by the specific structures disclosed or the apparent initial focus or emphasis on a particular structure or feature.

What is claimed is:

1. A bicycle sprocket apparatus comprising:
a sprocket mounting member including:
    a hub mounting portion structured to be mounted to a rotating hub that rotates around a rotational axis; and
    a sprocket mounting portion extending from the hub mounting portion, wherein the sprocket mounting portion includes a first sprocket mounting surface that faces in a first direction and a second sprocket mounting surface that faces in an opposite second direction;
a first sprocket disposed at the first sprocket mounting surface, wherein the first sprocket has a plurality of first chain-engaging teeth, and wherein the first sprocket is an axially endmost sprocket of the sprocket apparatus;
a second sprocket disposed at the second sprocket mounting surface, wherein the second sprocket has a plurality of second chain-engaging teeth;
a first fastener that fastens the first sprocket to the first sprocket mounting surface; and
a chain supporting structure extending from the first fastener in the first direction and projecting in the first direction away from a side surface of the first sprocket that faces in the first direction;
wherein the chain supporting structure has an axial width sufficient to catch the chain to prevent the chain from falling radially inwardly from the chain supporting structure.

2. The apparatus according to claim 1 wherein the number of first chain-engaging teeth is greater than the number of second chain-engaging teeth.

3. The apparatus according to claim 1 wherein the first fastener extends through the first sprocket, through the sprocket mounting member, and into the second sprocket to fasten the second sprocket to the second sprocket mounting surface.

4. The apparatus according to claim 1 wherein the first fastener extends through the first sprocket and into the sprocket mounting member.

5. The apparatus according to claim 4 wherein the first fastener comprises a pin.

6. The apparatus according to claim 5 wherein an entire axial width of the chain supporting structure is greater than an entire axial width of a portion of the pin that extends into the sprocket mounting member.

7. The apparatus according to claim 5 wherein an entire axial width of the chain supporting structure is greater than an entire axial width of a portion of the pin that extends through the first sprocket.

8. The apparatus according to claim 1 wherein the sprocket mounting portion includes a third sprocket mounting surface, and further comprising:
    a third sprocket disposed at the third sprocket mounting surface, wherein the third sprocket has a plurality of third chain-engaging teeth; and
    a second fastener that fastens the third sprocket to the third sprocket mounting surface.

9. A bicycle sprocket apparatus comprising:
a sprocket mounting member including:
    a hub mounting portion structured to be mounted to a rotating hub that rotates around a rotational axis; and
    a sprocket mounting portion extending from the hub mounting portion, wherein the sprocket mounting portion includes:
        a first sprocket mounting surface that faces in a first direction;
        a second sprocket mounting surface that faces in an opposite second direction; and
        a third sprocket mounting surface;
a first sprocket disposed at the first sprocket mounting surface, wherein the first sprocket has a plurality of first chain-engaging teeth;
a second sprocket disposed at the second sprocket mounting surface, wherein the second sprocket has a plurality of second chain-engaging teeth;
a third sprocket disposed at the third sprocket mounting surface, wherein the third sprocket has a plurality of third chain-engaging teeth;
a first fastener that fastens the first sprocket to the first sprocket mounting surface;
a chain supporting structure extending from the first fastener in the first direction and projecting in the first direction away from a side surface of the first sprocket that faces in the first direction;
wherein the chain supporting structure has an axial width sufficient to catch the chain to prevent the chain from falling radially inwardly from the chain supporting structure;
a second fastener that fastens the third sprocket to the third sprocket mounting surface; and
wherein the second fastener extends into the first sprocket.

10. The apparatus according to claim 9 wherein the third sprocket mounting surface is disposed radially inwardly from the second sprocket mounting surface.

11. The apparatus according to claim 10 wherein the number of first chain-engaging teeth is greater than the number of second chain-engaging teeth, and wherein the number of second chain-engaging teeth is greater than the number of third chain-engaging teeth.

12. The apparatus according to claim 1 wherein the first fastener forms the chain supporting structure.

13. The apparatus according to claim 1 further comprising a cap member disposed on the chain supporting structure.

14. The apparatus according to claim 13 wherein the cap member comprises a tubular member.

15. The apparatus according to claim 8 wherein the second fastener does not extend into the second sprocket.

16. The apparatus according to claim 1 wherein the axial width is at least 2 mm.

17. The apparatus according to claim 16 wherein the axial width is at least 3 mm.

18. The apparatus according to claim 6 wherein the chain supporting structure forms a free end of the first fastener.

19. The apparatus according to claim 7 wherein the chain supporting structure forms a free end of the first fastener.

20. The apparatus according to claim 8 wherein the second fastener has a head part that has a greater radial width than another portion of the second fastener, and wherein an entire axial width of the chain supporting structure is greater than an entire axial width of the head part of the second fastener.

* * * * *